United States Patent
Henriksson et al.

(10) Patent No.: US 8,713,264 B2
(45) Date of Patent: Apr. 29, 2014

(54) DATA PROCESSING CIRCUIT WITH ARBITRATION BETWEEN A PLURALITY OF QUEUES

(71) Applicant: Synopsys, Inc., Mountain View, CA (US)

(72) Inventors: Tomas Henriksson, Sollentuna (SE); Elisabeth Francisca Maria Steffens, Eindhoven (NL)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/906,224

(22) Filed: May 30, 2013

(65) Prior Publication Data
US 2013/0275662 A1 Oct. 17, 2013

Related U.S. Application Data

(62) Division of application No. 13/056,104, filed as application No. PCT/IB2009/053260 on Jul. 27, 2009, now Pat. No. 8,478,950.

(30) Foreign Application Priority Data

Jul. 29, 2008 (EP) .................................. 08161300

(51) Int. Cl.
*G06F 12/00* (2006.01)
(52) U.S. Cl.
USPC ............................. 711/158; 711/151; 711/167
(58) Field of Classification Search
USPC .......................................... 711/151, 158, 167
See application file for complete search history.

(56) References Cited

U.S. PATENT DOCUMENTS 6,629,220 B1 9/2003 Dyer

FOREIGN PATENT DOCUMENTS

WO WO 2007/032866 A1 3/2007

OTHER PUBLICATIONS

Chinese First Office Action, Chinese Application No. 200980137990.0, May 27, 2013, 19 pages.

*Primary Examiner* — John Lane
(74) *Attorney, Agent, or Firm* — Fenwick & West LLP

(57) ABSTRACT

Requests from a plurality of different agents (10) are passed to a request handler via a request concentrator. In front of the request concentrator the requests are queued in a plurality of queues (12). A first one of the agents is configured to issue a priority changing command with a defined position relative to pending requests issued by the first one of the agents (10) to the first one of the queues (12). An arbiter (16), makes successive selections selecting queues (12) from which the request concentrator (14) will pass requests to the request handler (18), based on relative priorities assigned to the queues (12). The arbiter (16) responds to the priority changing command by changing the priority of the first one of the queues (12), selectively for a duration while the pending requests up to the defined position are in the first one of the queues (12). Different queues may be provided for read and write requests from the first one of the agents. In this case, the priority raising request from the agent may be used to raise the priority level of the write queue temporarily to the level of the read queue, until all write requests issued before the priority raising command from the agent have been passed to the request handler.

18 Claims, 5 Drawing Sheets

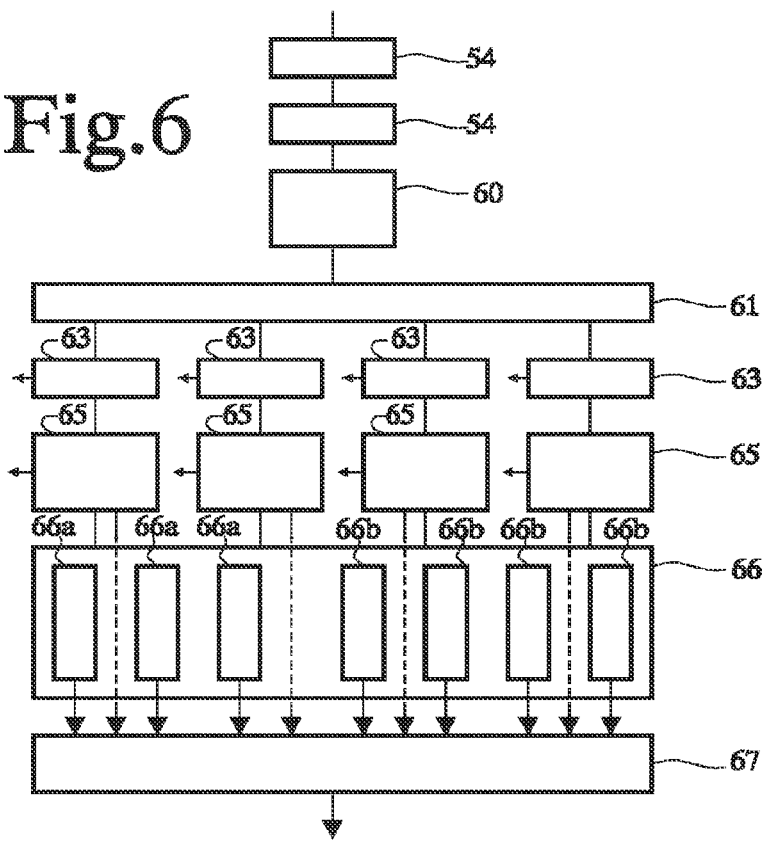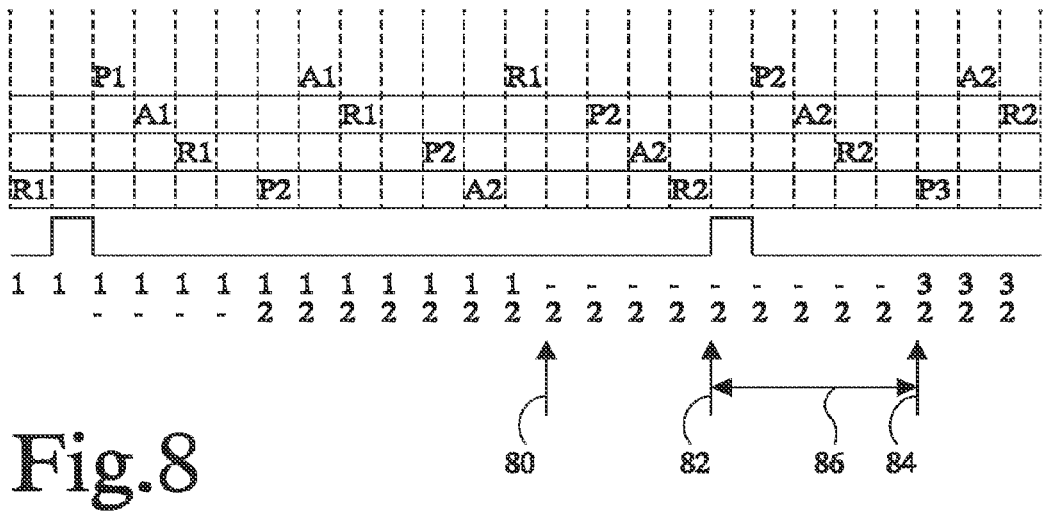

DATA PROCESSING CIRCUIT WITH ARBITRATION BETWEEN A PLURALITY OF QUEUES

CROSS-REFERENCE TO RELATED APPLICATION

This application is a divisional of U.S. patent application Ser. No. 13/056,104 filed on Jan. 26, 2011, which is 371 national phase entry of International Application No. PCT/IB2009/053260 filed on Jul. 27, 2009, which claims priority to European Patent Application No. 08161300.2 filed on Jul. 29, 2008, which are incorporated by reference herein in their entirety.

FIELD OF THE INVENTION

The invention relates to a data processing system with an arbiter for arbitrating requests, such as requests to access a storage device.

BACKGROUND ART

U.S. Pat. No. 6,629,220 describes dynamic arbitration of memory access requests. A circuit with a plurality of queues of memory access requests is described, associated for example with various processors, I/O interfaces hardware accelerators etc. An arbiter transfers the requests from these queues to a global queue. When doing so, the arbiter has to select the order in which it transfers the requests from different queues. This is done by assigning relative priorities to the different queues and by transferring each time the first pending request from the queue with highest priority.

Unfortunately, this means that requests from queues with low priority may have to wait longer dependent on the number of pending requests in other queues with higher priority. Moreover, the delays may even be influenced by lower priority requests, once the arbiter has committed itself to handle such a lower priority request. Waiting for handling of requests from other queues can result in long and unpredictable knock-on delays in processors that issued requests to the low priority queues. Such knock on delays can be reduced by giving higher priority to requests when the processor has to wait for a response.

Thus, for example memory read requests can be given a higher priority than memory write requests, provided of course that they concern different memory addresses.

U.S. Pat. No. 6,629,220 describes that an instruction can be used to give one queue priority over the others, and that queues with certain types of request, such as requests for use in synchronous communication, may be given higher priority than other queues with other types of requests, such requests for use in asynchronous communication.

Extremely long delays can be avoided by dynamically changing the relative priority of different queues. Generally, priority changes may be based on the duration for which a request has been queued, the number of requests that have been serviced from different queues, bus activity etc.

Although measures of this type help to reduce delays, a processor may still have to wait a long and unpredictable time interval before it gets a response to a request.

SUMMARY OF THE INVENTION

Among others, it is an object to provide for a better control over delays in a system with a plurality of queues.

A data processing circuit according to claim 1 is provided. Herein requests, such as memory access requests, are passed from agents, such as instruction processors, to a request handler via a plurality of queues. The agents have the ability to issue commands to control temporary increases of priority of the queues. The priority of a first one of the queues is raised for a duration while the pending requests up to a defined position are in the first one of the queues. This gives the agent some control over priority, so that the priority can be raised dependent on the task being executed, for example when it is known that a stall situation may arise until a request from the first one of the queues is executed. This may make it possible to provide for less stalling without needing more complex task independent priority adjustment schemes.

In an embodiment the same agent may have multiple queues, such as a queue for memory read requests and a queue for memory write requests, which normally have different priorities. In this embodiment the priority level of the lower priority queue may be raised temporarily to the level of the higher priority queue. Thus, the raised priority need not upset priority differentiation between different agents.

In an embodiment the duration of increased priority may last until a last request that was issued by the first one of the agents before the priority changing command has been passed to the request handler. Thus the duration of increased priority may be defined by relative timing, without requiring further information. The priority changing command may be implemented as a request in the stream of requests supplies to the first one of the queues. In this way no separate command outputs are needed.

In an embodiment a specified address in the priority changing command is used to determine the duration of raised priority. The priority of the queue is returned to its original level upon detection request with the specified address has been passed from the relevant queue to the request handler. In this way the duration of raised priority (and resulting increased delay for other queues) may more easily be reduced without giving low priority to requests that need higher priority. In a further embodiment the requests in the queue may be re-ordered, placing the more urgent request up front. This further reduces the time the duration of raised priority.

According to another aspect a data processing circuit according to claim 12 is provided. Herein the time points of selection of queues for passing memory access requests from the queues is controlled by a memory controller on the basis of the predicted time of the first action for a next request passed from the highest priority queue, rather than the earlier time at which space for this request is available in the request handler. In this way it is made possible to pass late arriving requests in higher priority queues first. In an embodiment, the predicted time depends on the content of the preceding memory access requests, for example on the size of a burst selected by the requests.

BRIEF DESCRIPTION OF THE DRAWINGS

These and other objects and advantageous aspects will become apparent from a description of exemplary embodiments, using the following Figures.

FIG. 6 shows a memory control circuit
FIG. 8 illustrates timing of selection of queues

DETAILED DESCRIPTION OF EXEMPLARY EMBODIMENTS

Figure 1:
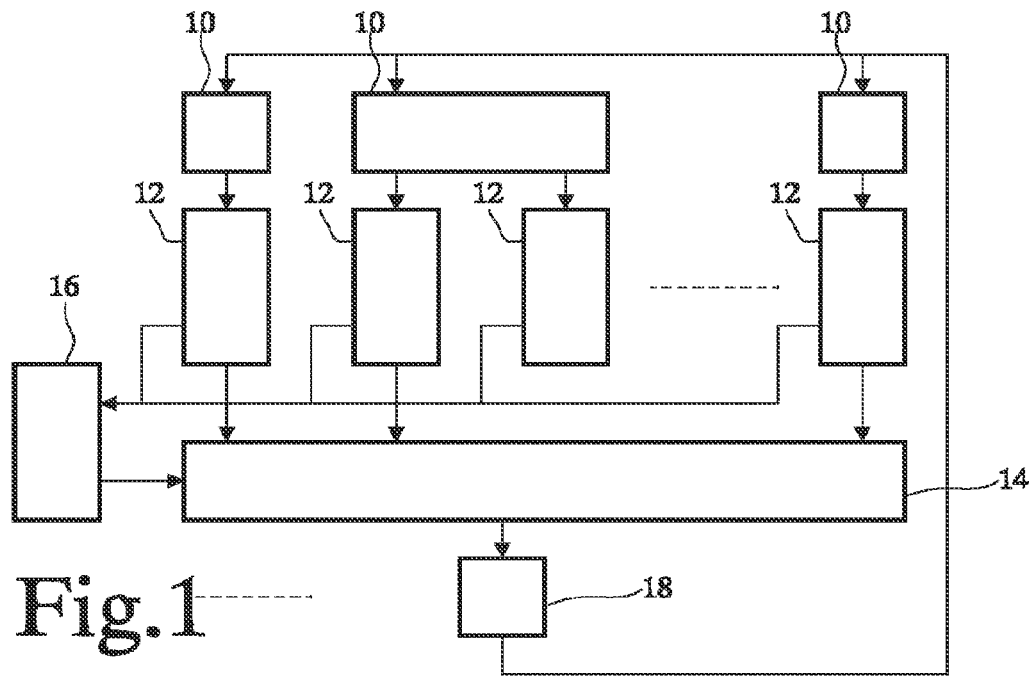
FIG. 1 shows a system with queues for a plurality of agents

FIG. 1 shows a system comprising a plurality of agents 10, a plurality of queues 12, a request concentrator 14, an arbiter 16 and a request handler 18. Each agent 10 (also called initiator or master) is coupled to request concentrator 14 via one or more queues 12. By way of example, one agent 10 is shown to have two queues 12, but more queues 12 may be used per agent 10, and more agents 10 may have more than one queue 12. By way of example, each agent 10 may be a processor circuit, an input and/or output circuit coupled to a communication terminal (not shown) etc. Arbiter 16 is coupled to queues 12 and request concentrator 14. Request concentrator 14, which may be a multiplexer, has an output coupled to request handler 18 (also called slave or target). Request handler 18 has return connections to at least part of agents 10. By way of example, request handler 18 may be a memory with an access controller that handles requests to access the memory. In this case, the return connections may serve to return data read from the memory in response to read requests.

Although queues 12 are shown as distinct circuit elements, it should be appreciated that a plurality of different queues may be implemented by means of a single memory. Thus for example, the different queues of a same agent may be implemented using a single memory. Different regions of the memory may be used for different queues, or requests associated with different queues may be stored together in one common queue, combined with indications of the queues to which they belong.

In operation each agent 10 sends respective streams of requests (also called commands) to its queue 12 or queues 12. The queue 12 or queues 12 buffer the requests. Different streams, from a same agent 10 to different queues 12 may be used. For example memory read requests from the agent 10 in one stream may be placed in one queue 12 and memory write requests from that agent 10 may be placed in another stream in another queue 12. Similarly requests in support of synchronous communication and asynchronous communication may be placed in different queues 12 (synchronous communication refers to communication that has to meet predetermined time limits, whereas asynchronous communication does not have meet such time limits). Although direct connections from agents 10 to queues 12 are shown, it should be understood that an agent 10 may comprise a distributor (not shown) for receiving a mixed stream with different types of requests and configures to distribute the received requests to different queues 12 according to the type of requests.

Arbiter 16 repeatedly reads the status of the queues 12 of all agents 10 and each time selects one queue 12 from which the first buffered request will be passed. Arbiter 16 may have an enable input (not shown) for receiving an enable signal from request handler 18, to indicate each time when a selection must be made. Arbiter 16 signals the selection to request concentrator 14, which passes the first request from the selected queue 12 to request handler 18. As is known per se, the selection may be based on relative priorities assigned to queues 12. In one embodiment, arbiter may assign relatively higher priorities to queues 12 for memory read requests than to queues for memory write requests. Similarly, a queue for requests in support of synchronous communication may be given a higher priority than requests in support of asynchronous communication, or the queues of certain agents may be given higher priority than the queues for other agents.

In an embodiment a queue 12 may be provided for prefetch read requests, distinct from a queue 12 for other read requests. Instruction processors or cache circuits that act as agents may be configured to predict addresses of data or instructions that will be needed in the future and to issue prefetch instructions for those addresses. In this embodiment at least one agent is designed to signal which read requests are based on prefetching and to store those prefetch requests in a distinct queue. Arbiter 16 may be configured to assign a lower priority to this queue than to the queue with read requests.

When relative priorities are used, arbiter 16 first determines whether there is a buffered request in the queue 12 of highest priority and if so, it selects that queue 12, to pass the front request from that queue to request handler 18 (i.e., unless the queue was reordered, the request that was longest in the queue). If the highest priority queue 12 does not buffer any request, arbiter determines whether the queue 12 of next lower priority contains a request and so on. If their is a plurality of queues 12 with the same priority, arbiter 16 may implicitly define dynamically changing relative sub-priorities for these queues, for example in round robin fashion.

Figure 2:
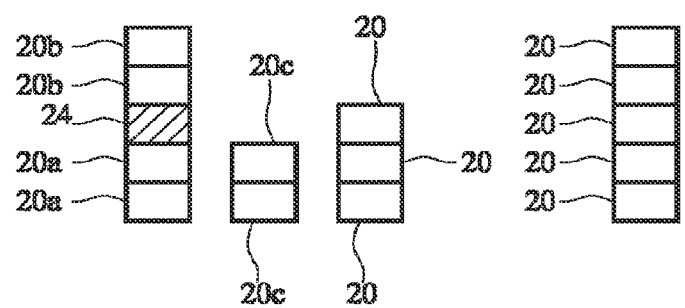
FIG. 2 illustrates a plurality of streams of requests

FIG. 2 illustrates a plurality of streams of requests 20, 20a, 20b, 20c, that may be buffered in respective queues 12. At least one of the agents 10 is configured to supply a priority changing command, for example by including a priority changing request 24 in a stream of requests 20a,b that it transmits to one of its queues 12. Inclusion in the stream serves to define a position in the stream to which the priority changing request applies, but techniques other than inclusion may be used for the purpose of defining a position specified by the priority changing command.

Arbiter 16 is configured to detect the priority changing request 24 and, in response to detection, to raise the priority of the queue that buffers requests 20a,b from the stream to which the priority changing request 24 applies, until the last request from that queue at a position in the stream before the position defined by the priority changing request 24 has been passed to request handler 18. In an embodiment the agent 10 that issued the priority changing request 24 may have a plurality of queues 12 (with requests 20a,b, 24 and with requests 20c, respectively), and arbiter 16 may be configured to equalize the priorities of these queues 12 for the agent 10 until the position defined by the priority changing request 24 has been reached.

In one embodiment, this may be applied to queues 12 for read requests 20c and write requests 20a,b from the same agent 10 respectively. In this case, the queue 12 for read requests 20c may normally have a higher priority than the queue 12 for write requests 20a,b, but in response to the priority changing request 24, arbiter 16 assigns the priority of the agent's queue 12 for read requests 20c also to the agent's queue 12 for write requests 20a,b. As a result, requests 20a from the queue 12 that has a raised priority will be handled earlier. The write requests 20a for example, may be handled on a par with the read requests 20c, rather than being forced to wait until all read requests 20c from the same agent 10 an other agents 10 have been passed to request handler 18.

The agent or agents 10 with the capability to issue priority changing requests may be an instruction processor, for executing programs with instructions that include instructions to issue normal requests and instructions to issue priority changing requests. When a programmer (or a compiler) knows that execution of the program may stall until a certain request has been handled, the programmer may add a priority changing request to the program for the queue of that certain request in order to reduce the time lost to stalling.

The following table I shows an example of instructions and corresponding requests

TABLE I

| Store R1, A1 | write request at A1 |
|---|---|
| LoadR1, A2 | read request from A2 |
| LoadR2, A3 | read request from A3 |
| Send raise request | priority raise request |
| Load R3, A1 | read request from A1 |

Herein, execution of the store instruction results in issuing a write request to a write queue. Normally, this write queue has low priority. However, because information is available that a read request from the same address will be issued, an instruction to issue a priority raising request may be included in the program. This instruction can be located in the program anywhere after the store instruction, for example in a basic block of the program with the load instruction (a basic block is a series of instructions that starts with a branch target but has no further branch targets inside). The programmer or compiler is free to control whether priority will be raised. When it is known that there is no urgency to complete the program, no instruction to issue a priority raising request may be included in the program.

In another embodiment the agent 10 comprises a cache circuit, which is configured to issue requests as an indirect response to load and store instructions. Table II shows an example of instructions, cache responses and requests in this case.

TABLE II

| Store R1, A1 | write through | write request at A1 |
|---|---|---|
| Load R1, A2 | from cache | |
| Load R2, A3 | cache miss, fetch | read request from A3 |
| ... | | |
| Load R3, A1 | dirty cache line, refill | Priority raise request |
| | | read request from A1 |

The left column shows instruction executed by a processor in the agent, the middle column shows cache actions and the right columns shows requests issued by the cache circuit. Some load instructions can be serviced from the cache circuit, so that no requests are needed. Others cause the cache circuit to issue read requests to obtain data. The store instruction causes the cache to copy data to the background memory. In the example it is assumed that this, or some other cache action, will make it necessary to refill the cache line from background memory. In response to the load instruction the cache circuit sends a write request to the queue. This request is stored in a write queue, which has low priority.

The load instruction from the cache line with the store request causes the cache circuit to issue a read request. This request will have to wait for the completion of the store instruction. To speed up processing, the cache circuit also issues a priority raising request to the queue. As may be noted, it is the cache circuit, rather than the queue, which controls the rise in priority. Thus, the queue need not decide about this.

Figure 3:
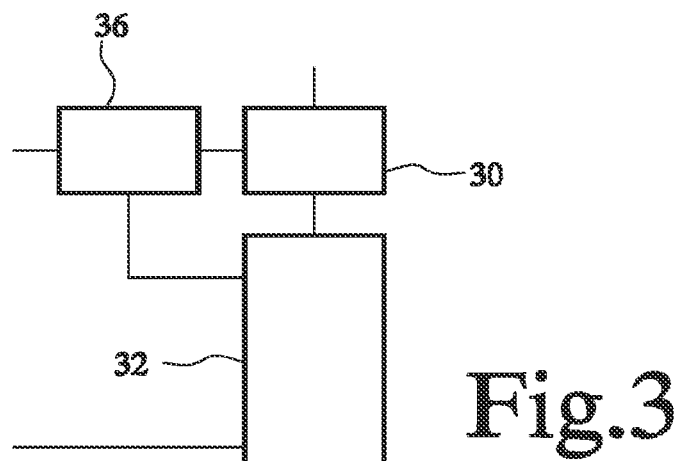
FIG. 3 shows an embodiment of a queue

FIG. 3 shows an embodiment of a queue 12, comprising an input interface 30, a FIFO buffer 32, an output interface 34 and a priority changing request detector 36. FIFO buffer 32 is coupled between input interface 30 and output interface 34. Priority changing request detector 36 has an input coupled to input interface 30 and an enable output coupled to FIFO buffer 32. In this embodiment priority changing requests are not buffered in the queue.

Input interface 30 may comprise connections for receiving request information, such as an address, a request type indication and optional data, and a control signal indicating the availability of a request from its corresponding agent (not shown). It may also provide for handshake connections to stall the agent if FIFO buffer 32 is full. Output interface 34 may comprise connections for supplying information, such as an address and optional data, and for receiving an accept signal from the concentrator (not shown).

Priority changing request detector 36 is configured to receive an indication of the request type and to enable FIFO buffer 32 to buffer the request if it is not a priority changing request. Priority changing request detector 36 is configured to record detection of a priority changing request and to store an indication of the position of the last received priority changing request relative to requests in FIFO buffer 32.

FIFO buffer 32 may be implemented by means of a memory wherein requests are stored in a series of memory locations and pointers are stored to indicate the location of the last entered request and the first entered request that has not yet been passed. In this case, priority changing request detector 36 may comprise a further memory location wherein a pointer to the location of the last received request at the time of receiving the last priority changing request is stored. If this pointer points between the positions of the first and last request, a change of priority is required. Alternatively, the indication may indicate the distance from the last added request, in which case priority changing request detector 36 may increase the distance each time when a request is added, or the indication may be a count of request from the first buffered, bur not yet passed request, in which case the indication is decreased each time when a request is passed from the queue.

When a queue of the type of FIG. 3 is used, arbiter 16 does not need to inspect all requests in the queue to determine whether a priority changing request has been received. Instead arbiter 16 may read the indication of the position of the last received priority changing request, if any, within the positions of requests that are still in the queue to determine whether a change of priority is needed for use in the selection of the next queue from which a request will be passed.

As noted, the priority changing request implicitly indicates a position in the queue because it is part of the stream of requests. However, it should be noted that alternatively, the priority change may be signaled by a priority changing command in parallel with the stream, in which case its relative timing with respect to transmission of requests in the stream may be used to define the position.

In an embodiment the priority changing request may comprise an explicit indication of the position, for example in terms of a number of preceding requests supplied by the agent since the last request to which the change of priority has to apply. In this case, priority changing request detector 36 may use this number to compute the indication of the position.

In another embodiment, the priority changing request may comprise an address specified by the agent 10 and corresponding to an address used in the last preceding request to which the change in priority must apply. In this case, priority changing request detector 36 may be configured to update the address each time when it receives a priority changing request and to set a flag indicating the need to the change in priority. Priority changing request detector 36 may be configured to supply this flag and the address to arbiter 16. The arbiter may be configured to read the flag and to raise the priority of the queue involved in response, and to compare the addresses of requests passed from that queue with the indicated address.

Once arbiter detects that a request with this address is passed, it resets the flag indicating the need to change the priority.

Figure 4:
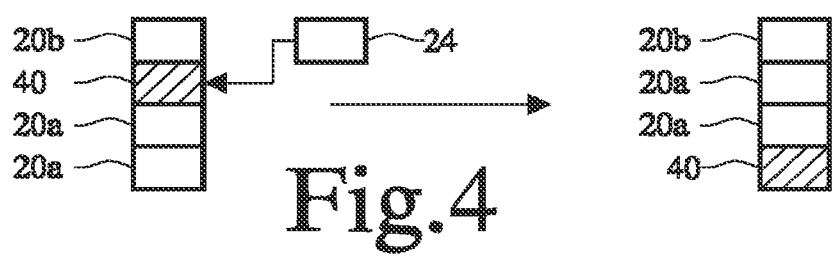
FIG. 4 illustrates rearrangement of queued requests

In another embodiment, the sequence of requests in the queue may be rearranged in response to the priority changing request, as illustrated in FIG. 4. Herein the priority changing request 24 is shown outside the stream, with an arrow indicating a specific request 40 that is indicated by the priority changing request 24. As shown, the queue modifies the sequence of the request, by moving the specific indicated request 40 to front position in the queue from which it will be passed to the request handler 18 before any other requests from the queue. In addition, the priority of the queue is raised until this specific indicated request 40 has been passed. In this way, the time interval during which priority is raised can be kept at a minimum, with the effect that extra delays in other queues are minimized.

This may be implemented for example, by using a processing circuit in priority changing request detector 36, configured to copy the specific indicated request 40 from FIFO buffer 32 in response to the priority changing request, to move back, in FIFO buffer 32, the requests 20a that preceded this specific indicated request 40 and to insert the extracted the specific indicated request 40 at the head of FIFO buffer 32.

Although a queue with a FIFO buffer has been shown, which may be implemented using a shift register, or a cyclically used memory in region in combination with read and write pointer to the beginning and end of queued data in the memory region, it should be understood that FIFO functionality may be implemented in many other ways. For example, request could be stored randomly with information indicative of their logical position in a queue, and a search could be made for the oldest request of a type associated with a particular queue in order to identify the oldest request, or pointers to different randomly stored requests of a queue may be used.

Figure 5:
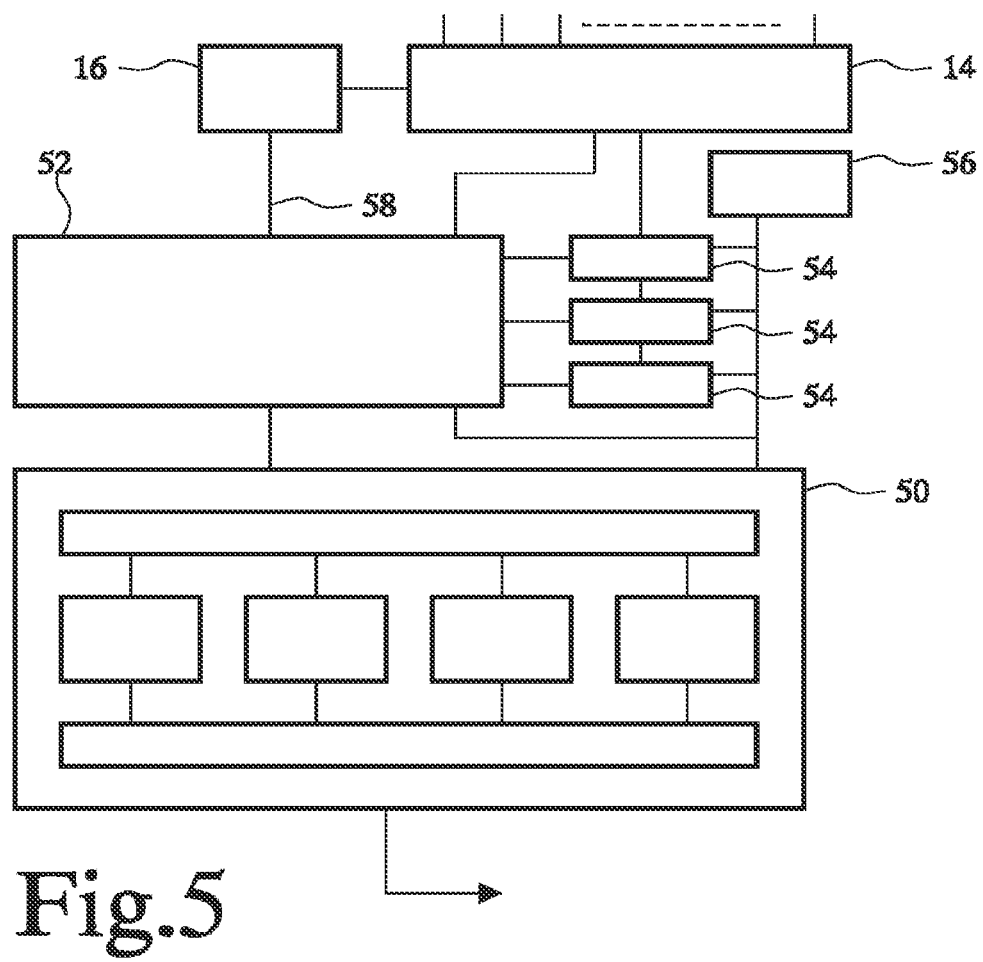
FIG. 5 shows a request handler

FIG. 5 shows an embodiment of a request handler, comprising a memory 50, a memory controller 52, request registers 54 (two shown by way of example) and a clock circuit 56. Memory controller 52 comprises a plurality of state registers 520 (two shown by way of example). In this embodiment the request handler is designed to control the selection time point at which arbiter 16 selects the queue from which request concentrator 14 will pass the next request to the request handler. In particular, the request handler is designed to delay this selection time point, based on state information from memory controller 52. By delaying the selection time point it is made possible that a late arriving request in a high priority queue may be passed and handled earlier than in the case that the selection time point is not delayed, so that the selection is made before the arrival of the late arriving request. Memory 50 and may be implemented in a dedicated memory integrated circuit, coupled to another integrated circuit that comprises request concentrator 14 and arbiter 16.

Clock circuit 56 is coupled to memory 50, memory controller 52 and request registers 54, to signal successive cycles of memory operation. The output of the request concentrator 14 is coupled to request registers 54. Request registers 54 may be coupled to form a shift register, in which case the output of the request concentrator is coupled to the front of the shift register. Outputs of request registers 54 are coupled to memory controller 52, which in turn has control outputs coupled to memory 50. Memory 50 may comprise a plurality of memory banks and multiplexers to couple the banks cyclically to inputs and outputs of memory 50. Furthermore, memory controller 52 has a time point selection output 58 coupled to the arbiter 16.

In operation, request information derived from requests that have been passed from the queues is stored in request registers 54. The request information may comprise address information for example, it may also comprise information to indicate whether the request is a read or write request and information to indicate a burst sizes. Memory controller 52 uses the request information from different request registers 54 in parallel to control pipelined operation of memory 50.

In addition to controlling access operations, memory controller 52 generates a time point selection signal to arbiter 16, to indicate when selection of a queue should be performed. Memory controller 52 generates the time point selection signal to arbiter 16 dependent on states reached during handling of previous memory access requests. Selection of a queue is delayed beyond a time at which a request register becomes vacant, in order to afford late arriving high priority requests the opportunity to be passed first.

In an embodiment memory 50 is a DRAM memory. In a DRAM memory a page mode access may be used. In a typical DRAM memory, handling of a request comprises the operations of precharging memory 50 (i.e. transferring memory data from a page register to a page of memory cells in a memory bank), activating a row of a memory matrix according to address information from a request (i.e. transferring memory data from memory cells at a specified page address in a memory bank to a register) and reading or writing from and to the register, as necessary for a request.

FIG. 6 illustrates an example of an embodiment of the memory controller. In this embodiment the memory controller comprises a request converter 60, a distributor 61, elementary request registers 63, request execution state machines 65, a set of state registers/counters 66 and a timing selector 67. State machines 65 are coupled to elementary request registers 63 and the set of state registers/counters 66. State machines 65 and request registers 63 are coupled to the memory banks (not shown). Timing selector 67 has inputs coupled to the state registers/counters 66a,b and the state machines 65.

In operation timing selector 67 uses state information from state registers/counters 66a,b and the state machines 65 to control the timing of selection generate the time point selection signal to the arbiter (not shown). Before discussing generation of the time point selection signal, an example of memory control will be briefly discussed.

Request converter 60 has an input coupled to request registers 54. Distributor 61 is coupled between request converter 60 and elementary request registers 63. The set of state registers/counters 66 comprises global state registers/counters 66a and bank specific registers/counters 66b. By way of example three global state registers/counters 66a and one bank specific counter 66b for each bank are shown, but different numbers of registers/counters may be used, dependent on the implementation.

In an embodiment the registers/counters a global counter indicating a number of cycles that data terminals of the memory will remain occupied, and for each memory bank a register indicating whether the bank is in use, a register with the page address of the page that is in the memory register, a counter, indicating the number of cycles before a current precharge operation will be completed, and a counter indicating the number of cycles before a current activation operation will be completed. In addition a global counter may be provided to indicate a number of cycles before a next activation operation is allowed, and a global counter indicating a number of cycles that data terminals of the memory will remain occupied may be refined to a plurality of counters indicating respective numbers of cycles before read after previous read will be allowed, a read after previous write will be allowed, a write after previous read will be allowed and a write after previous write will be allowed. In an embodiment the counters may include a refresh counter, or a plurality of refresh counters for respective ones of the banks, for counting a number that is indicative of a number of cycles before a refresh operation will be completed (as is well known, DRAM memory requires the content of cells to be refreshed when it has not been updated for some time).

State machines 65 are coupled to elementary request registers 63 and the set of state registers/counters 66. The term "state machine" is used in a descriptive sense, to indicate that a sequence of states can be distinguished in the operation of the circuits that implement state machines 65. These circuits may be general purpose state machine circuits programmed to provide the state machine operation needed for memory access, but it should be appreciated that the state machines may be any dedicated memory control circuits which can be said to pass through successive states.

In operation, request converter 60 converts memory access requests from a request register 54 into requests relating to single data words. Request registers 54 may be used as a FIFO queue to request converter 60. In an embodiment a single request register may be used, the queue being one register long. In another embodiment a request registers 54 queue may be used: one for a request that is currently converted and one for a future request. The requests in request registers 54 may concern different numbers of data words: some requests concern a single word, while others may concern a burst of a plurality of data words at successive addresses. Request converter 60 splits the latter requests into single word requests and feeds single word related requests and elementary requests to elementary request registers 63 that are free to receive new requests when request registers 63 are available. State machines 65 generate control signals for the memory banks (not shown) to perform the precharge, activate and read or write operations.

Figure 7:
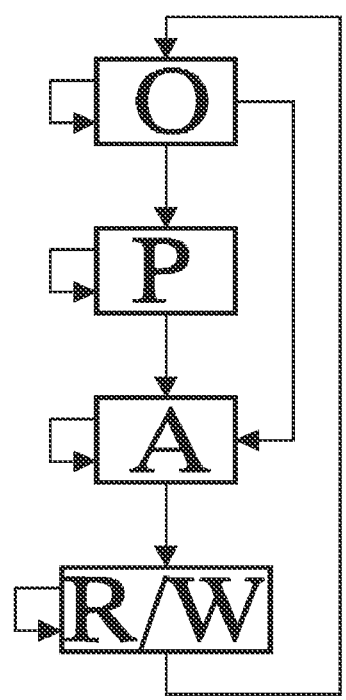
FIG. 7 shows a state diagram of request execution

FIG. 7 schematically shows a state diagram explaining the operation of a state machine 65. The state diagram shows an initial state O, a precharge state P, an activate state A and a read or write state R/W. When a request is loaded into the elementary request register 63 of the state machine 65, the state machine 65 is initially in the initial state O. The request in the elementary request register 63 comprises an address that indicates a selected memory bank needed to handle the request, the page in that memory bank and the location within said page.

State machine 65 remains in the initial state as long as information in the set of registers/counters 66 indicates that the selected memory bank is in use by another state machine. When exiting from the initial state O state machine 65 sets the information in the set of registers/counters 66 that indicates that the selected memory bank is in use. State machine 65 transits to the read/write state if the memory bank is free and information in the set of registers/counters 66 indicates that the last used page address in the selected memory bank matches the page address of the request in the elementary request register 63 and a global counter 66a in set of counters/registers 66 indicates that the data terminals of the memory will be free for use. If the page address does not match state machine 65 transits to the precharge state P. Upon entering the precharge state, state machine 65 generates a signal to the selected memory bank to perform a precharge operation.

State machine 65 transits from the precharge state P to the activate state A after a predetermined number of cycles (seven for example) necessary to complete precharging, and optionally if a global counter 66a in set of counters/registers indicates that another predetermined number of cycles has elapsed from the previous activation operation (this may be done to prevent excessive currents due to activations closely after each other). A counter in set of registers/counters 66 may be used to count the cycles necessary to complete precharging, after being set by state machine 65 upon entering the precharge state P. Upon entering the activation state, state machine 65 generates a signal to the selected memory bank to perform an activation operation for the page address from the elementary request register 63.

State machine 65 transits from the activate state A to the read/write state W/R after a predetermined number of cycles necessary to complete activation (seven for example), and if a global counter 66a in set of counters/registers 66 indicates that the data terminals of the memory will be free for use. A counter in set of registers/counters 66 may be used to count the cycles necessary to complete activation, after being set by state machine 65 upon entering the activation state P. This counter may be used to trigger the counter that indicates the cycles elapsed from the previous activation operation.

Upon entering the read/write state, state machine 65 sets a global counter 66a in set of counters/registers 66 to indicate that the data terminals of the memory will not be free for use for a number of cycles (four cycles for example). In the case of a read operation, state machine 65 controls the memory bank to transfer data from the access register of the selected memory bank to the data terminals of the memory for the intra-page address indicated by the address in the elementary request register 63. In the case of a write operation, state machine 65 controls the memory bank to transfer data from the data terminals of the memory to the access register of the memory bank for the intra-page address indicated by the address in the elementary request register 63. A plurality of different counters may be used to indicate numbers of cycles wherein the data terminals are not available for different types of access, dependent on the previous type of access. The time interval between entering the read/write state R/W and the cycles at which the data is on the data terminals of the memory may be different for read and write. Accordingly, state machine 65 may set the counters in set of counters/registers 66 differently dependent on whether the elementary request register 63 indicates a read or write request.

After completing the transfer, state machine 65 returns to the initial state, clearing the signal that the selected memory bank is in use and the elementary request register 63 of the state machine is signaled to be free.

Timing selector 67 uses state information from state registers/counters 66a,b and the state machines 65 to control the timing of the time point selection signal to the arbiter (not shown). The time point selection signal is generated at a time point when it is expected that a new request can be handled within a predetermined number of cycles M that it is needed to enter a request from the queues (not shown) in the memory controller.

In a first embodiment timing selector 67 determines the time point when this is expected from the state of the state machines 55. Each state may be associated with a minimum number of cycles before it leaves the data terminals of the memory free. In this case timing selector 67 may select the maximum of the respective numbers of cycles time associated with the observed states of the state machines 55 and compare this maximum with the predetermined number M, the time point selection signal being generated when the maximum is not larger than M. Here M may represent the number of cycles needed before a first request derived from a queue can reach the R/W state.

In a further embodiment, timing selector 67 may compute the associated numbers of cycles of different states dependent on counter values from state registers/counters 66a,b. For example, the number of cycles associated with the precharge state may be computed by adding a count of cycles before completion of the precharge operation to a base number for the precharge state. In a further embodiment the base number may be added to a maximum of on one hand the count of cycles before completion of the precharge operation and on the other hand a number of cycles that still has to from a previous activation operation. Here a comparison with a number M may be performed that represent the number of cycles needed before a first request derived from a queue can reach the precharge state. Timing selector 67 determines the selection time point from a result of this comparison when the computed number of cycles equals the number of cycles M, or is less than M.

In an embodiment wherein the counters include one or more refresh counters, the refresh counter may be set at the start of execution of a refresh operation an updated in successive cycles. In one example the counter may address successive rows of a memory matrix for refresh. In this embodiment timing selector 67 may compare a number of cycles indicated by count value of the refresh counter with a predetermined number of cycles M. Timing selector 67 determines the selection time point from a result of this comparison, when the indicated remaining number of refresh cycles is equal to M or less than M.

In another embodiment, timing selector 67 may compute an aggregate number of cycles from state information from the state machines. Thus, for example, timing selector 67 may compute a sum of the number of read and write cycles needed for the requests in elementary request registers 63, compare this sum with the predetermined number M and generate the time point selection signal when the sum does not exceed the number M. In a further embodiment a current count value from the set of register/counters 15 indicating number of cycles for which the data terminals of the memory will not be free for use due to a request may be added to the sum of the number of read and write cycles needed for the other requests, and compared to the predetermined number.

Timing selector 67 may perform a plurality of different kinds of such computations and use the maximum number of cycles in the comparison with the number N used to generate the time point selection signal. Furthermore, timing selector 67 may be configured to read information from request converter 60 to determine a number of cycles for which the data terminal will be needed for the individual requests that the request converter 60 has not yet supplied based on a current request from request registers 54. Timing selector 67 may add this number of cycles to the computed number of cycles determined for the individual requests in elementary request registers 63 in the comparison with the predetermined number M. Similarly, timing selector 67 may be configured to read information from request registers 54 about pending requests and add this information.

It may be noted that the timing of the time point selection signal need not be completely accurate in the sense that it must make certain that a next request can be handled immediately if arbiter 16 selects a queue at the indicated time point. It suffices that it is ensured that buffer space for a request from the selected queue is available. Otherwise, as long as the time point selection signal corresponds to a prediction approximately equal to such a completely accurate time point, operation can be improved.

FIG. 8 illustrates a simplified example of timing of the time point selection signal in this embodiment. Dashed bars indicate the start of clock cycles. The first four traces indicate the operations started in respective memory banks in the clock cycles (P denotes the start of precharging, A denotes the start of activation and R denotes the start of reading of data and the numbers behind these letters distinguish the different requests for which these operations are executed). A further trace shows a signal with pulses indicating when memory controller 52 enables selection by the arbiter. The final traces indicate the requests in request registers 54.

At the time point marked by first arrow 80, the request register 54 for the first transaction (1) becomes vacant because the last operation for first transaction 1 is completed. However, the enable signal to enable the arbiter to select a queue is not generated until the time point indicated by second arrow 82. This time point corresponds to a prediction of the first time point (indicated by arrow 84) whereat memory 50 needs the request that will be passed from the selected queue, counting back a predetermined number M of clock cycles (indicated by arrow 86). Memory controller 52 uses state information about progress of the operations effectively to predict when the time point 84 will occur, determines whether the current cycle is M cycles before that time point 84 and generates the enable signal in that cycle if there is a vacant request register 54.

It should be noted that a number of clock cycles elapses between the time points 80 and 82 during which the request register remains vacant. By delaying selection of a queue, although there is room for passing a request, late arriving high priority requests get the opportunity to be passed first.

In an example, a queue can be selected by the arbiter, a request passed from the selected queue and the memory controller can set up a next operation based on that request in six clock cycles. In this case memory controller 52 generates the time point selection signal upon detection that a request register 54 is vacant and handling of the requests in the other request register 54 has progressed to a stage six cycles before the first operation for a new request can be performed. The number six is merely an example: if the time form queue selection to set up is M clock cycles before completion, where M may have any value, the time point selection signal may be generated M cycles before the first operation for a new request can be performed.

It should be noted that a number of clock cycles elapses between the time points 80 and 82 during which the request register remains vacant. By delaying selection of a queue, although there is room for passing a request, late arriving high priority requests get the opportunity to be passed first.

Although an embodiment has been described wherein the temporary priority of the queue for an agent is selected based on the priority of another queue for that agent, it should be appreciated that other ways of selecting priority may used. For example, the priority changing command may specify the priority level that will be used, or a predetermined temporary priority level may be assigned.

Although an embodiment has been described wherein the concentrator passes one request passed at a time, it should be appreciated that more than one request may be passed at a time, for example dependent on the size of the requests. In this case the measures of the embodiments may be modified so that at least one of the requests is selected as described.

Although no mention has been made of possible conflicts between requests, it should be appreciated that additional coordination of queues may be provided for in a conventional way, using detection of conflicting requests, such as read and writes to the same address. Although embodiments have been shown wherein the request handler handles memory access requests, it should be appreciated that other types of request handlers may be used, such as I/O request handlers to handle requests for I/O via an I/O device. Although embodiments have been shown wherein an agent is a programmable processor circuit, it should be appreciated that part or all of the agents may be other circuits, such as task specific co-processor circuits.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid state medium supplied together with or as part of other hardware, but may also be distributed in other forms, such as via the Internet or other wired or wireless telecommunication systems. Any reference signs in the claims should not be construed as limiting the scope.

The invention claimed is:

1. A data processing circuit, comprising:
   a plurality of queues, each queue configured to queue memory access requests issued by each of a plurality of agents;
   an arbiter configured to select one of the plurality of queues at a selection time based on a relative priority assigned to each of the plurality of the queues, the arbiter comprising a time selection input;
   a request concentrator coupled to the plurality of queues and configured to forward a memory access request in the selected queue;
   a request handler coupled to the request concentrator and comprising memory on which to perform a read or write operation according to the forwarded memory access request, the request handler configured to send a signal indicative of the selection time to the time selection input of the arbiter; and
   wherein each queue comprises:
   an input interface coupled to each of the plurality of agents;
   a buffer coupled to the input interface to receive and store memory access request;
   a priority changing request detector having an input coupled to the input interface to detect and store an indication of a priority changing request and to prevent storing of the priority changing request in the buffer; and
   an output interface between the buffer and the request concentrator.

2. The data processing circuit of claim 1, wherein the arbiter comprises:
   registers configured to store the forward memory access request;
   a memory control circuit coupled to the registers and configured to execute the stored memory access request on the memory, the memory control circuit configured to transition through a sequence of states in each read or write cycle; and
   a time selector configured to generate a time selection input indicative of the selection time after the registers become available to store a memory access request.

3. The data processing circuit of claim 2, wherein the time selector is configured to determine a delay between a first time at which the time selection input is generated and a second time at which the registers become available store the memory access request is based on a state of the memory control circuit.

4. The data processing circuit of claim 2, wherein the registers form a shift register, one end of the register coupled to the request concentrator and the other end of the shift register coupled to the memory control circuit.

5. The data processing circuit of claim 2, wherein the memory is a dynamic random-access memory (DRAM).

6. The data processing circuit of claim 2, wherein the memory control circuit comprises a counter configured to count a number of cycles before the memory control circuit makes a state transition, the time selector configured to determine reaching of the selection time based on a count of the counter.

7. The data processing circuit of claim 2, wherein the memory control circuit comprises a refresh counter configured to count cycles during a memory refresh operation, the time selector configured to determine reaching of the selection time based on the count of the refresh counter.

8. The data processing circuit of claim 2, wherein the sequence of states comprise an initial state, a precharge state following the initial state, an activate state following the precharge state and a read or write state following the precharge state.

9. The data processing circuit of claim 8, wherein the memory control circuit transitions from the precharge state to the activate state after a predetermined number of clock cycles.

10. A data processing method, comprising:
    queuing memory access requests issued by each of the plurality of agents in each of a plurality of queues;
    selecting, by an arbiter, one of the plurality of queues at a selection time based on a relative priority assigned to each of the plurality of the queues;
    forwarding a memory access request in the selected queue from a request concentrator to a request handler;
    performing a read or write operation on memory included in the request handler according to the forwarded memory access request;
    sending a signal indicative of the selection time from the request handle to the arbiter; and
    further comprising:
    receiving the memory access requests and a priority changing request at an input interface of each queue;
    storing the memory access request in a buffer; and
    detecting the priority changing request and preventing storing of the priority changing request in the buffer.

11. The method of claim 10, wherein the selecting by the arbiter comprises:
    storing the forward memory access request in registers;
    transitioning through a sequence of states by a memory control circuit in each read or write cycle;
    executing the stored memory access request on the memory; and
    generating a time selection input indicative of the selection time after the registers become available to store a memory access request.

12. The method of claim 11, further comprising determining a delay between a first time at which the time selection input is generated and a second time at which the registers become available store the memory access request is based on based on a state of the memory control circuit.

13. The method of claim 11, wherein the registers form a shift register, one end of the register coupled to the request concentrator and the other end of the shift register coupled to the memory control circuit.

14. The method of claim 11, wherein the memory is a dynamic random-access memory (DRAM).

15. The method of claim 11, further comprising:
counting a number of cycles before the memory control circuit makes a state transition; and
determining reaching of the selection time based on a count of the counter.

16. The method of claim 11, further comprising:
counting cycles during a memory refresh operation; and
determining reaching of the selection time based on the count of the refresh counter.

17. The method of claim 11, wherein the sequence of states comprise an initial state, a precharge state following the initial state, an activate state following the precharge state and a read or write state following the precharge state.

18. The method of claim 17, wherein transition from the precharge state to the activate state is made after a predetermined number of clock cycles.

* * * * *